T. E. MURRAY.
VALVE.
APPLICATION FILED DEC. 29, 1916.

1,225,479.

Patented May 8, 1917.

Inventor
Thomas E. Murray
By his Attorney

UNITED STATES PATENT OFFICE.

THOMAS E. MURRAY, OF NEW YORK, N. Y.

VALVE.

1,225,479.  Specification of Letters Patent.  Patented May 8, 1917.

Application filed December 29, 1916. Serial No. 139,504.

*To all whom it may concern:*

Be it known that I, THOMAS E. MURRAY, a citizen of the United States, residing at New York, in the county of New York and State of New York, have invented a certain new and useful Improvement in Valves, of which the following is a specification.

The invention is a valve, and has for its object to cheapen and simplify the construction, and to enable the principal parts of the valve chamber and certain parts of the valve to be made of sheet metal stamped, struck up or pressed into form and united where necessary by electrically welded joints.

In the accompanying drawings—

Figure 1:
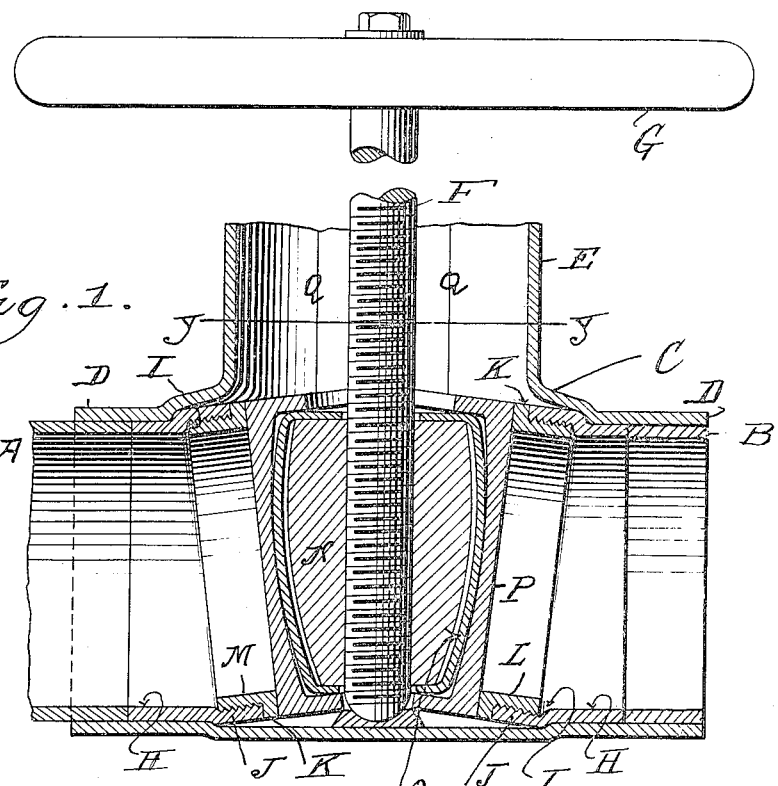
Figure 2:
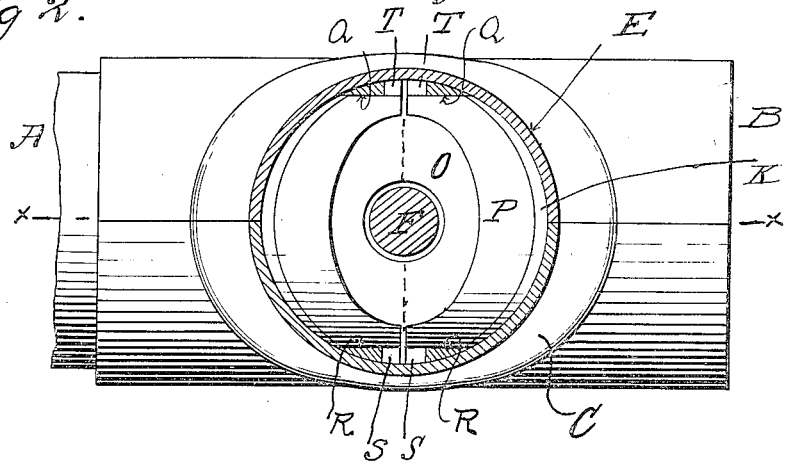

Figure 1 is a vertical section of my valve on the line $x$, $x$ of Fig. 2. Fig. 2 is a horizontal section on the line $y$, $y$ of Fig. 1.

Similar letters of reference indicate like parts.

A and B are the ends of the ducts between which the valve chamber is placed. C is the valve chamber having tubular projections D oppositely disposed to receive said duct ends, which ends may be electrically welded in said projections. Said chamber has a tubular projection E, through which passes the threaded valve stem F. In the upper part of said projection E is the usual stuffing-box for the valve stem, (not shown), and at the upper end of the said stem is the hand wheel G, by turning which the threaded stem is rotated to raise and lower the valve.

Fitting in projections D of valve chamber C registering with the ends of ducts A, B are rings H which are internally shouldered at I. The inner portions J of the rings H beyond the shoulders I are internally threaded and upwardly inclined.

K is the valve seat, here of inverted frusto-conical shape, having on opposite sides tubular downwardly inclined projections L, M which surround the ports in the wall of said seat and are externally threaded to enter the threaded portions of rings H.

The valve comprises a solid core, here a nut N, of substantially the shape shown, through which passes the threaded stem F. Inclosing the nut N is a steel casing O formed in two longitudinal half sections having flanges extending over the top and under the bottom of the nut N. Inclosing the nut and casing is the shell P, also formed in two longitudinal half sections, having flanges extending over the flanges on casing O. The shell P is frusto-conical in shape to fit in the frusto-conical seat K when the valve is in closed position, as shown in Fig. 1.

The object of making the shell P in sections is to permit of ready removal of these parts when worn and the substitution of new and similar parts. The steel casing O, also formed in half sections, is on its exterior made convex so as to bear against the middle portions of the shell sections, and so to exert spring pressure on said shell sections to force them outwardly and into close contact with the seat K.

In order to guide the valve in its vertical movement, I provide on the inner side of chamber projection E oppositely disposed pairs of vertical ribs Q, Q and R, R, so that between the members of each pair there is a vertical recess. On the half sections of valve shell P, I form ribs S, S and T, T—the ribs S, S entering the recess between ribs R, R and the ribs T, T entering the recess between ribs Q, Q.

It is to be particularly noted that all parts of this valve and its seat are formed of struck up sheet metal. The chamber C is formed of two sections longitudinally divided on the line $x$, $x$ and electrically welded together at their edges. The shouldered and threaded rings H are simply stamped or struck up. The valve seat K is made in two half sections, also struck up or stamped.

I claim:

1. A valve chamber, a tubular valve seat having ports in its wall, and a valve; the said valve comprising a stem, a core thereon, an expansible shell inclosing said core and bearing against said seat, and resilient means interposed between said core and said shell for expanding said shell to force it against said seat.

2. A valve chamber, oppositely disposed ducts communicating with said chamber, a tubular valve seat in said chamber having ports in its wall, tubular externally threaded projections on said seat surrounding said ports, a valve in said seat, means for moving said valve to open and close said ports, and internally threaded rings secured in said chamber, receiving said threaded projections and registering with the ends of said ducts.

3. A valve chamber, oppositely disposed ducts communicating with said chamber, a tubular valve seat in said chamber having ports in its wall, tubular externally threaded projections on said seat surrounding said ports, a valve in said seat, guide grooves on the inner periphery of said chamber wall, ribs on said valve entering said grooves, means for moving said valve to open and close said ports, and internally threaded rings secured in said chamber, receiving said threaded projections and registering with the ends of said ducts.

4. A valve chamber, a tubular valve seat therein in inverted frusto-conical form having ports in its wall, a valve in said seat, and means for moving said valve to open and close said ports; the said valve comprising a core, a shell formed of two semi-tubular half sections inclosing said core and having flanges extending above and below said core, and means interposed between said core and said shell sections for resiliently expanding said sections.

5. A valve chamber of sheet metal formed in two half sections electrically welded at their meeting edges and having oppositely disposed tubular projections for receiving the ends of ducts, a tubular valve seat of sheet metal in said chamber having oppositely disposed ports and formed in two half sections electrically welded at their meeting edges, tubular projections on said valve seat surrounding said ports and secured in said chamber projections, and a valve in said seat; the said valve comprising a solid core, a shell formed of two semi-tubular half sections on said core and bearing on said seat, and means for moving said valve to open and close said ports.

6. A valve chamber, a tubular valve seat therein in inverted frusto conical form having ports in its wall, a valve in said seat, and means for moving said valve to open and close said ports; the said valve comprising a core, a resilient casing formed of two semi-tubular half sections inclosing said core and having flanges extending above and below said core, and a shell formed of two semi-tubular half sections inclosing said casing and having flanges extending over said casing flanges.

In testimony whereof I have affixed my signature in presence of two witnesses.

THOMAS E. MURRAY.

Witnesses:
GERTRUDE T. PORTER,
MAY T. McGARRY.